United States Patent
Yeh et al.

(10) Patent No.: US 9,473,344 B2
(45) Date of Patent: Oct. 18, 2016

(54) CIRCUIT AND METHOD FOR SETTING DATA AND THEIR APPLICATION TO INTEGRATED CIRCUIT

(75) Inventors: Ming-Yuh Yeh, Tai Pei (TW); Chi-Shun Weng, Hsin Chu County (TW); Ming-Je Li, I Lan County (TW); Kai-Yi Fang, Kao Hsiung County (TW); Meng-Han Hsieh, Hsin Chu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 296 days.

(21) Appl. No.: 12/340,443

(22) Filed: Dec. 19, 2008

(65) Prior Publication Data

US 2009/0164628 A1 Jun. 25, 2009

(30) Foreign Application Priority Data

Dec. 20, 2007 (TW) .............................. 96149053 A

(51) Int. Cl.
| | |
|---|---|
| *G06F 3/00* | (2006.01) |
| *G06F 13/14* | (2006.01) |
| *H04L 29/12* | (2006.01) |
| *G06F 13/40* | (2006.01) |
| *H04L 29/08* | (2006.01) |

(52) U.S. Cl.
CPC ..... *H04L 29/12254* (2013.01); *G06F 13/4068* (2013.01); *H04L 61/2038* (2013.01); *H04L 69/32* (2013.01); *H04L 69/324* (2013.01); *G06F 2213/0052* (2013.01)

(58) Field of Classification Search
USPC .......................................... 710/3, 4, 9, 305
See application file for complete search history.

(56) References Cited

U.S. PATENT DOCUMENTS

| | | | | |
|---|---|---|---|---|
| 3,623,013 | A | * 11/1971 | Perkins et al. .................... | 710/9 |
| 4,228,504 | A | * 10/1980 | Lewis et al. ................. | 711/201 |
| 4,360,870 | A | * 11/1982 | McVey ............................. | 710/9 |
| 4,621,342 | A | * 11/1986 | Capizzi et al. ............... | 710/111 |
| 4,977,397 | A | * 12/1990 | Kuo et al. ..................... | 345/163 |
| 5,208,805 | A | *  5/1993 | Ochiai ......................... | 370/389 |
| 5,467,457 | A | * 11/1995 | Kohda et al. ................. | 711/102 |
| 5,535,396 | A | *  7/1996 | Cohen et al. ................. | 710/260 |
| 5,699,250 | A | * 12/1997 | Kobayashi ...................... | 701/48 |
| 5,790,888 | A | *  8/1998 | Dreyer et al. ..................... | 710/5 |
| 5,862,356 | A | *  1/1999 | Normoyle et al. ........... | 710/116 |
| 5,928,345 | A | *  7/1999 | Tetzlaff et al. .............. | 710/107 |
| 5,946,462 | A | *  8/1999 | Rangan et al. ................. | 714/49 |
| 5,978,853 | A | * 11/1999 | Crayford et al. ............. | 709/245 |
| 6,011,799 | A | *  1/2000 | Kerstein et al. .............. | 370/422 |

(Continued)

FOREIGN PATENT DOCUMENTS

| | | |
|---|---|---|
| JP | 2005277937 A | 10/2005 |
| JP | 2007-66067 A | 3/2007 |

OTHER PUBLICATIONS

English translation of abstract of JP 2005277937.

(Continued)

*Primary Examiner* — Faisal M Zaman
(74) *Attorney, Agent, or Firm* — McClure, Qualey & Rodack, LLP

(57) ABSTRACT

An integrated circuit is disclosed, including at least one configuration pin, an interface circuit, a detecting circuit, a determining circuit and a storage unit. A physical layer circuit of the invention not only increases the flexibility of setting PHY addresses, but also reduces the number of configuration pins.

11 Claims, 5 Drawing Sheets

(56) References Cited

U.S. PATENT DOCUMENTS

| | | | |
|---|---|---|---|
| 6,016,541 A * | 1/2000 | Tashima et al. | 712/217 |
| 6,073,132 A * | 6/2000 | Gehman | |
| 6,107,937 A * | 8/2000 | Hamada | 340/825.69 |
| 6,385,208 B1 * | 5/2002 | Findlater | H04L 7/0008 370/401 |
| 6,445,709 B1 | 9/2002 | Chiang | |
| 6,754,721 B2 * | 6/2004 | Heckel | 710/4 |
| 6,795,881 B1 * | 9/2004 | Bachrach | H04L 12/40032 370/903 |
| 7,020,823 B2 * | 3/2006 | Bushmitch et al. | 714/752 |
| 7,039,196 B1 * | 5/2006 | Becker et al. | 381/86 |
| 7,185,134 B2 * | 2/2007 | Kim et al. | 710/313 |
| 7,424,583 B2 * | 9/2008 | Tsuboki et al. | 711/162 |
| 2007/0050545 A1 | 3/2007 | Tsuboki et al. | |
| 2008/0095104 A1 * | 4/2008 | Hansen | H04N 5/775 370/329 |

OTHER PUBLICATIONS

German Examination Report dated Aug. 10, 2010.
Japan Office Action mailed Feb. 8, 2011.

* cited by examiner

| | management frame fields | | | | | | |
|---|---|---|---|---|---|---|---|
| | PRE | ST | OP | PHYAD | REGAD | TA | DATA | IDLE |
| READ | 1...1 | 01 | 10 | AAAAA | RRRRR | Z0 | DDDDDDDDDDDDDDDD | Z |
| WRITE | 1...1 | 01 | 01 | AAAAA | RRRRR | 10 | DDDDDDDDDDDDDDDD | Z |

FIG. 2 (PRIOR ART)

CIRCUIT AND METHOD FOR SETTING DATA AND THEIR APPLICATION TO INTEGRATED CIRCUIT

This application claims the benefit of the filing date of Taiwan Application Ser. No. 096149053, filed on Dec. 20, 2007, the content of which is incorporated herein by reference.

BACKGROUND OF THE INVENTION

1. Field of the invention

The invention relates to an integrated circuit, particularly to a setting method for an integrated circuit.

2. Description of the Related Art

FIG. 1 shows the relationship of the open system interconnection (OSI) seven-layer network model with the physical layer and media access control (MAC) layer. IEEE 802.3 defines the data frame format of the MAC layer 110 and the electrical characteristics of the physical layer 120. The physical layer 120 has different layer structure according to the bit rate. On one hand, the physical layer 120 communicates with the MAC layer 110 via the media independent interface (MII) or gigabit media independent interface (GMII). On the other hand, the physical layer 120 communicates with the physical medium layer 130 via a media dependent interface (MDI).

Generally, a network driver program is operated for the MAC layer to access or write registers of the physical layer circuit via MDC (management data clock)/MDIO (management data input/output) as shown in FIG. 3. In order to comply with the IEEE 802.3 standard, each physical layer circuit has five configuration pins to set the address of the physical layer circuit. In other words, one MAC layer can communicate with each different physical layer circuit via each different address. Under the IEEE 802.3 standard, the MAC layer 110 issues the management frame format as shown in FIG. 2 where the value in the PHYAD field is the address of the physical layer circuit which the MAC layer 110 attempts to communicate with. If the address of a physical layer circuit equals the value in the PHYAD field in the management frame format, this physical layer circuit is to be communicated with the MAC layer 110. However, under the specification of the 5-bit PHYAD value of the IEEE 802.3 standard, the conventional physical layer circuit uses these five configuration pins to receive a 5-bit address setting value in order to comply with the IEEE 802.3 standard.

SUMMARY OF THE INVENTION

One objective of the invention is to provide a physical layer circuit to solve the above mentioned problems.

One objective of the invention is to provide a physical layer circuit to increase the flexibility of setting physical layer addresses.

One objective of the invention is to provide a physical layer circuit to reduce the number of configuration pins of the physical layer circuit.

One objective of the invention is to provide a physical layer circuit to receive an address from the MAC circuit to reduce the number of configuration pins of the physical layer circuit.

In order to achieve the above objectives, the invention provides an integrated circuit, comprising: a first circuit for receiving an first input value, wherein the first input value represents a priority; an interface circuit for receiving a second input signal and generating an identification data according to the second input signal; a second circuit, coupled to the first circuit and the interface circuit, for determining whether to hold the identification data according to the priority; and a first storage unit, coupled to the determining circuit, for storing the identification data according to a decision made by the second circuit.

Another object of the invention is to provide a method for setting an integrated circuit, the method comprising: receiving a first input value, wherein the setting value indicates a priority; receiving a second input signal; obtaining an identification data according to the second input signal; and determining whether to hold the identification data according to the priority.

Another object of the invention is to provide a network device, comprising: a media access control (MAC) circuit; and a physical (PHY) circuit, coupled to the MAC circuit, for receiving a first input value that indicates a priority, receiving a physical layer address (PHYAD) from the MAC circuit and determining whether an address of the PHY circuit is setting to the PHYAD or not according to the priority.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 2 shows all of fields of the management frame format.

DETAILED DESCRIPTION OF THE INVENTION

In this specification and the appended claims, some specific words are used to describe specific elements. It should be understood by those who are skilled in the art that some hardware manufacturer may use different names to indicate the same element. In this specification and the appended claims, elements are not differentiated by their names but their functions.

The invention takes the physical layer circuit of Ethernet network as an example for explanation. However, the setting circuit and method according to the invention can also be applied in other integrated circuits that need circuit setting.

Figure 1:
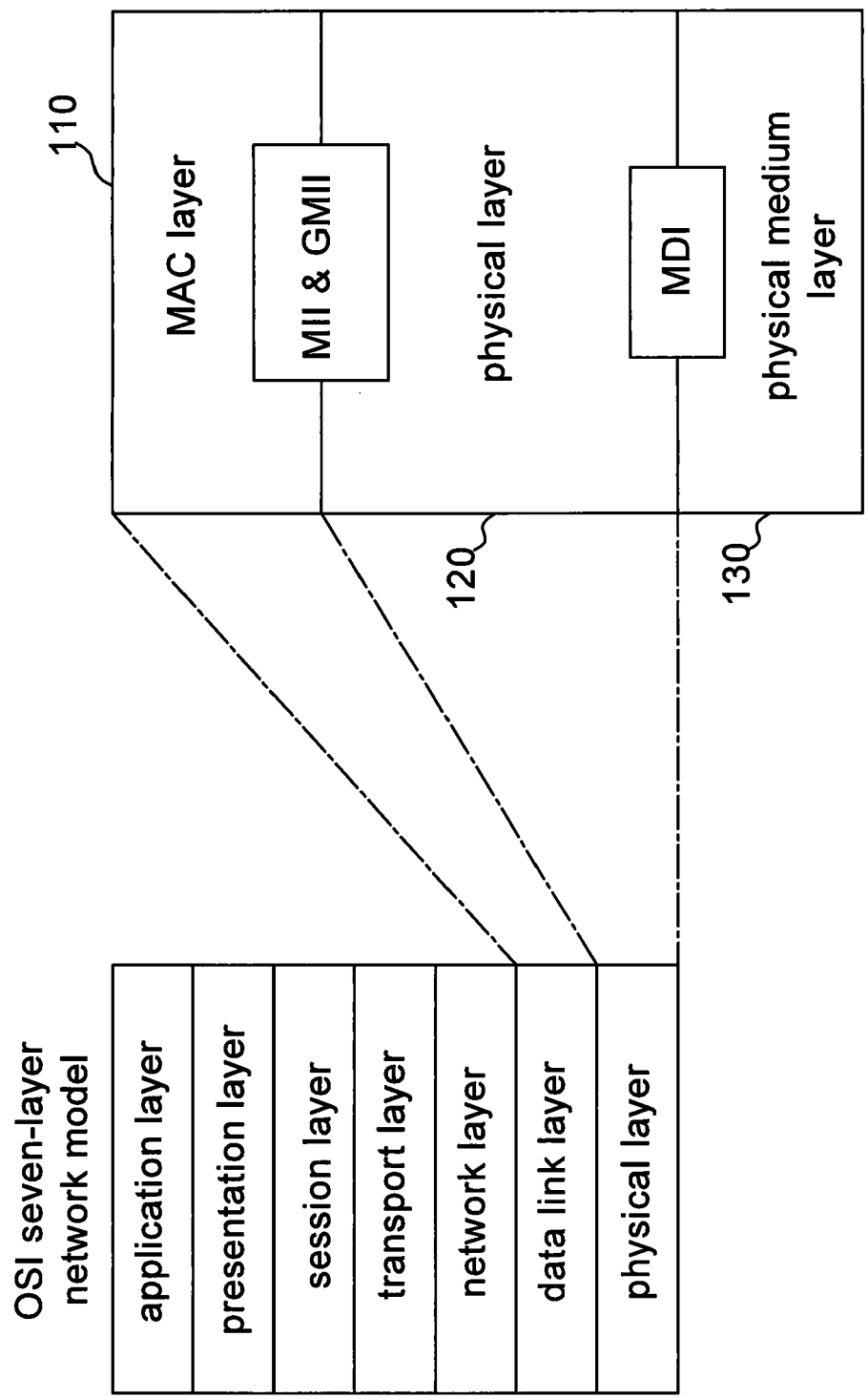
FIG. 1 shows the relationship of the open system interconnection (OSI) seven-layer network model with the physical layer and media access control layer (MAC).
Figure 3:
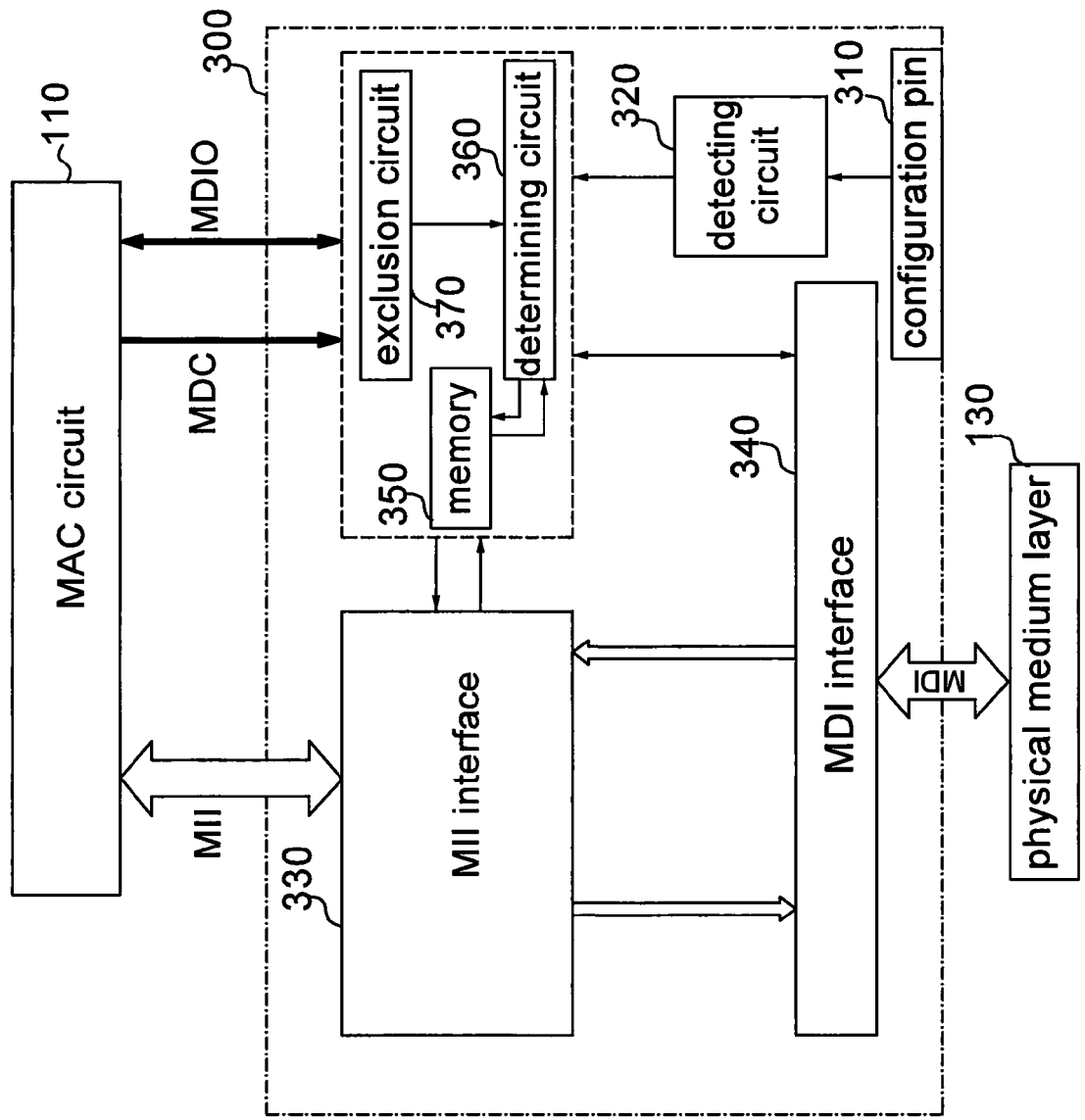
FIG. 3 shows a block diagram of the physical layer circuit according to one embodiment of the invention.

FIG. 3 shows a structural block diagram of the physical layer (PHY) circuit according to one embodiment of the invention. Please refer to FIG. 3. The PHY circuit 300 according to the invention includes a MII interface 330, a MDI interface 340, a determining circuit 360, a storage unit (memory) 350, a detecting circuit 320, an exclusion circuit 370 and at least one configuration pin 310.

The MAC circuit 110 transmits and receives packets to/from the PHY circuit 300 via the MII interface 330 and accesses the memory 350 (ex: register) via an interface circuit, for example an interface having MDC and MDIO pins. The detecting circuit 320 is used to receive a setting value from the configuration pin 310 and then stores the setting value in the memory 350. The setting value from the configuration pin 310 is independent on a PHY address and corresponding to an order or priority. For example, a setting value of 00 represents a first priority, a setting value of 01 represents a second priority, a setting value of 10 represents a third priority, and a setting value of 11 represents a fourth priority.

In an embodiment, the memory 350 includes a plurality of registers (not shown). For examples, an address register is used to store the PHYAD value outputted by the MAC circuit 110 as the address of the PHY circuit 300. At least one status register is used to indicate the status of the PHY circuit 300. At least one control register is used to control the operation of the PHY circuit 300. At least one register is used to store the above-mentioned setting value which represents the priority (order). In another embodiment, the memory 350 which is used for storing the PHYAD value outputted by the MAC circuit 110 can be a Non-Volatile Memory (for examples: ROM, Flash memory) to keep the PHYAD value when the PHY circuit 300 be powered off.

The determining circuit 360 receives the setting value (that is, priority or order) of the configuration pin 310 to determine that a PHYAD value, corresponding to the setting value (priority or order), issued by the MAC circuit 110 is the address of the PHY circuit 300 and is stored into the address register of the memory 350. In other words, the PHY circuit 300 regards the value stored in the address register as its own address. Accordingly, The MAC circuit 110 is operable to communicate with the PHY circuit 300 according to the PHYAD value stored into the address register of the memory 350.

Figure 4:
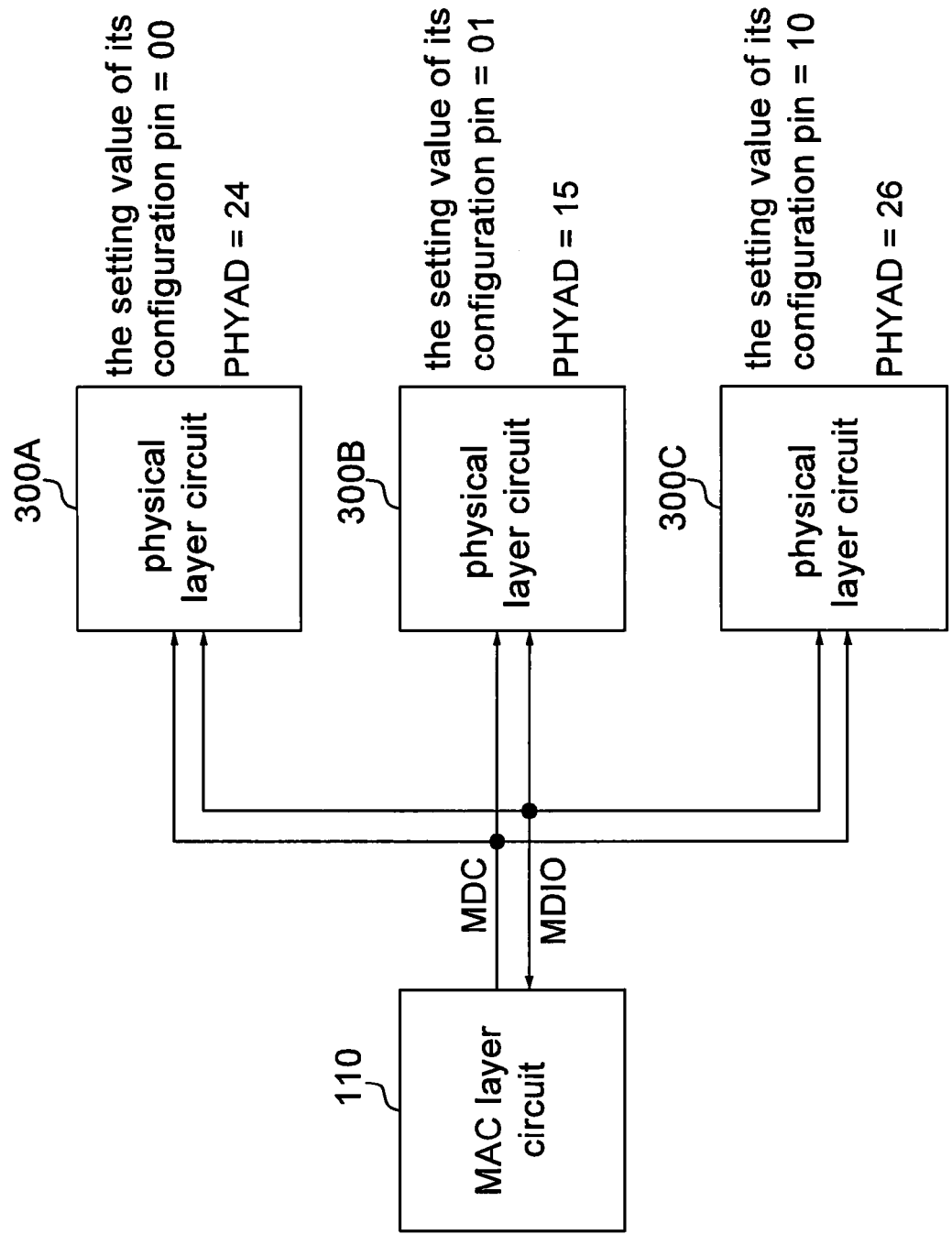
FIG. 4 shows a schematic diagram illustrating one media access control layer circuit connected to three physical layer circuits.
Figure 5:
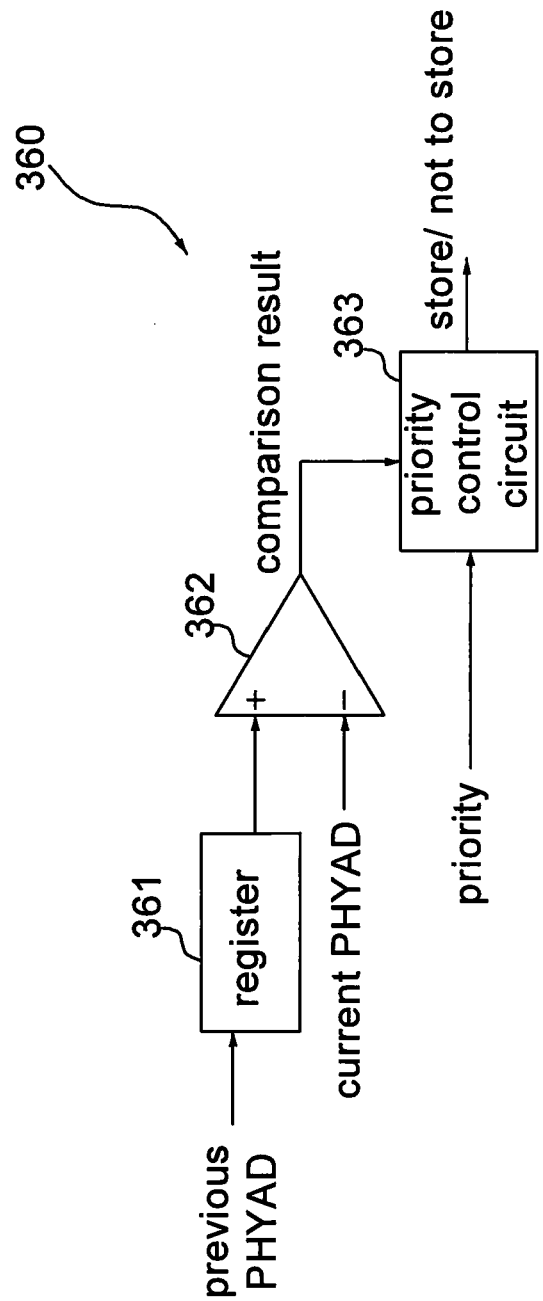
FIG. 5 shows a block diagram illustrating the determining circuit according to one embodiment of the invention.

In one embodiment, the determining circuit 360 includes a register 361, a comparing circuit 362, and a priority control circuit 363. An example is described as follows. Referring to FIG. 4, the setting value of the configuration pin 310 of the PHY circuit 300A is 00 (that is, the PHY circuit 300A is set to the first priority). The setting value of the configuration pin 310 of the PHY circuit 300B is 01 (that is, the PHY circuit 300B is set to the second priority). The setting value of the configuration pin 310 of the PHY circuit 300C is 10 (that is, the PHY circuit 300C is set to the third priority). Referring also to FIG. 5, the determining circuit 360 for the PHY circuit 300A, 300B, 300C each comprises a register 361, a comparing circuit 362, and a priority control circuit 363. As the system starts, the PHY circuits 300A, 300B, and 300C know that they are in order of priority, respectively. When the first PHYAD value (e.g., 24) is issued by the MAC circuit 110, the PHY circuit 300A with the first priority employs the first PHYAD value (24) as its address and stores the first PHYAD value (24) in the memory 350 of the PHY circuit 300A. At this moment, the PHY circuits 300B and 300C only store the first PHYAD value (24) in the register 361 (for recognizing that the address 24 is used by the other PHY circuit 300A and excluding this address 24 as their own addresses) and wait for the second and the third PHYAD values of the management frame format different from the first PHYAD value (24) of the management frame format, respectively. Following that, the second and the third PHYAD values of the management frame format are the addresses of the PHY circuits 300B and 300C, respectively. For example, the second PHYAD value is 15. Then, the addresses of the PHY circuits 300B is 15 and the register 361 of the PHY circuit 300C stores the values 24 and 15. For example, the third PHYAD value of the management frame format is 26. Then, the addresses of the PHY circuits 300C is set to 26. Therefore, the MAC circuit 110 can communicate with the PHY circuits 300A, 300B and 300C by using the addresses 24, 15, and 26, respectively.

Obviously, if the second PHYAD value of the management frame format is still 24 (i.e., the MAC circuit 110 will communicate with the PHY circuit 300A by using the address 24), the PHY circuits 300B and 300C compare the received PHYAD value (24) from the MAC 110 with the value (24) stored in the register 361 by the comparing circuit 362, respectively. If the two values are the same, the comparing circuit 362 generates a corresponding comparison result (indicating the two values are the same) and then transmits the comparison result to the priority control circuit 363. Next, the priority control circuit 363 generates an output signal (indicating that the current PHYAD value will not be stored) according to the comparison result and its priority to disable the memory 350. Then, the physical layer circuits 300B and 300C still wait for the following first and second PHYAD values of the management frame format that are different from the first PHYAD value (24) of the management frame format, respectively. In one embodiment, the priority control circuit 363 can be implemented by a counter or an adder. It is determined whether to increase the counter according to the comparison result of the comparing circuit 362. The counter is increased up to a certain value based on the priority and then outputs a control signal to control whether the address register stores the PHYAD value or not.

In one embodiment, the configuration pin 310 of the PHY circuit 300 is coupled to a PUSH-LOW element or a PUSH-HIGH element with in the PHY circuit 300 so that the detecting circuit 320 can still receive the setting value of 00 or 11 even if the configuration pin 310 of the physical layer circuit 300 is not connected to VDD or GND (i.e., floating). Thus, some elements, such as resistor, switch, can be omitted.

The invention can be used in the personal computer application, for example, a network interface card having only one PHY circuit 300A connected to the MAC circuit 110. In addition, the configuration pin 310 of the physical layer circuit 300 can be coupled to VDD or GND without passing through other elements, such as resistor, switch.

In one embodiment, the PHY circuit 300 according to invention includes an exclusion circuit 370 to directly exclude some specific addresses. For example, assuming that a PHY circuit 300 is designed to exclude the addresses 16-31, when the exclusion circuit 370 detects (finds) that the fifth bit of the PHYAD field of a management frame format is 1, the management frame format is discarded and the possibility of the PHYAD value as the address of the PHY circuit 300 is excluded. For examples, the exclusion circuit 370 disables the determining circuit 360 when the fifth bit of the PHYAD field is 1. In an alternate embodiment, the addresses 16-31 are predetermined and are pre-stored in the register 361 of the determining circuit 360 to assume that the addresses 16-31 may be used by other PHY circuits so that the addresses 16-31 are excluded from being its own address.

In an alternate embodiment, the above design assists the PHY circuit 300 of the invention in cooperation with the conventional PHY circuit. For example, a 16-port network switching apparatus includes an MAC circuit 110, six PHY circuits 300 according to this invention and ten conventional PHY circuits. The six PHY circuits 300 exclude the addresses 16-31 as their own addresses and respectively have three configuration pins for setting as the first, second, third, fourth, fifth, and sixth priority. This is merely one example. The first priority and the third to the seventh priority can be set as another example. The ten conventional PHY circuits respectively have five configuration pins to set their own addresses. Therefore, the five configuration pins of the ten conventional PHY circuits can be set to 10 different addresses between the addresses 16-31. Obviously, the numbers in this embodiment are only described for explanation. Those who are skilled in the art can alter the related design, accordingly.

The method and device for setting a PHY address of the invention comply with the IEEE 802.3 standard without using up to five configuration pins to set the PHY address. The invention is allowed to be cooperated with the conventional PHY circuit. Besides, the MAC circuit 110 will not be restrained from issuing some specific PHYAD values in order to communicate with specific PHY circuits. Therefore, the flexibility of setting the PHY address of the PHY circuit is increased. In addition, compared to the prior art, the invention has other merits. Firstly, according to the prior art, since the address of the PHY circuit is set by the input value associated with five configuration pins, the user has to change the input value associated with the five configuration pins (by adjusting external components, such as switch) in order to change the address of the conventional PHY circuit. By contrast, the invention does not need such an adjustment. Secondly, the problem that the address of the physical layer circuit in the prior art is set erroneously can be avoided. For example, the dual setting problem due to manual setting or circuit void soldering or circuit short can be avoided to reduce the production cost of the manufacturer.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An integrated circuit, comprising:
   plural configuration pins that, when configured, establish a priority value assigned to the integrated circuit;
   a storage unit;
   a detecting circuit that receives the priority value from the configuration pins and stores the priority value in the storage unit;
   an interface circuit that receives plural PHY addresses in succession, wherein the plural PHY addresses include a first PHY address and a second PHY address;
   a determining circuit comprising:
   a register;
   a comparing circuit; and
   a priority control circuit, wherein based on the priority value, the determining circuit stores the first PHY address in the register, and based on receiving the second PHY address, the comparing circuit compares the first PHY address stored in the register with the second PHY address and outputs a comparison result, wherein the priority control circuit receives the comparison result and based on the priority value, determines:
   if the first PHY address is equal to the second PHY address, the priority control circuit does not store the second PHY address; and
   if the first PHY address is not equal to the second PHY address, the priority control circuit stores the second PHY address in the storage unit.

2. The integrated circuit of claim 1, wherein fewer than all of the plural configuration pins are required to be configured to establish the priority value.

3. The integrated circuit of claim 1, wherein the priority control circuit comprises a counter or an adder.

4. The integrated circuit of claim 1, further comprising:
   at least one input end coupled with a PUSH-LOW element or a PUSH-HIGH element;
   wherein the plural configuration pins receive the priority value through the at least one input end.

5. The integrated circuit of claim 1, further comprising:
   an exclusion circuit, coupled to the interface circuit, for excluding at least one specific PHY address.

6. The integrated circuit of claim 1, being a network physical layer (PHY) circuit.

7. The integrated circuit of claim 6, wherein the interface circuit supports a MDIO/MDC interface standard.

8. A method for setting an integrated circuit, the method comprising:
   receiving by plural configuration pins a setting value that indicates a priority value of the integrated circuit;
   receiving, at an interface circuit, plural PHY addresses in succession, wherein the plural PHY addresses comprise a first PHY address and a second PHY address;
   storing, by a determining circuit, the first PHY address in a register based on the priority value; and
   based on receiving the second PHY address, comparing, by the determining circuit, the first and second PHY addresses;
   outputting a comparison result based on the comparing; and
   based on the priority value:
   denying storage of the first PHY address if the first PHY address is equal to the second PHY address; and
   storing in a storage unit the second PHY address if the first PHY address is different than the second PHY address.

9. The method according to claim 8, further comprising:
   determining whether the second PHY address is held or not according to a predetermined data and the second PHY address.

10. The method according to claim 8, further comprising:
    counting the number of times that different data appears to generate a counting value; and
    storing the second PHY address in the storage unit according to the counting value and the priority value.

11. The method according to claim 8, further comprising:
    monitoring the value of at least one bit of the second PHY address; and
    determining to exclude the second PHY address according to the result of monitoring.

* * * * *